US008843828B2

(12) United States Patent  (10) Patent No.: US 8,843,828 B2
McArdle  (45) Date of Patent: Sep. 23, 2014

(54) WEB PAGE BACKUP ACROSS MULTIPLE WINDOWS

(75) Inventor: James M. McArdle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1179 days.

(21) Appl. No.: 11/755,798

(22) Filed: May 31, 2007

(65) Prior Publication Data

US 2008/0301591 A1   Dec. 4, 2008

(51) Int. Cl.
  *G06F 3/048* (2013.01)
  *G06F 17/30* (2006.01)

(52) U.S. Cl.
  CPC ............................... *G06F 17/30905* (2013.01)
  USPC ........... 715/738; 715/739; 715/747; 715/760; 715/763

(58) Field of Classification Search
  CPC .................... G06F 17/30864; G06F 17/30867; G06F 17/30899; G06F 17/30884; G06F 17/3089
  USPC .......................... 715/738, 739, 747, 760, 763
  See application file for complete search history.

(56) References Cited

U.S. PATENT DOCUMENTS

| 7,007,237 B1* | 2/2006 | Sharpe ........................... 715/764 |
| 2005/0273723 A1* | 12/2005 | Sharpe ........................... 715/764 |
| 2008/0270377 A1* | 10/2008 | Liu et al. ........................... 707/5 |

* cited by examiner

*Primary Examiner* — Namitha Pillai
(74) *Attorney, Agent, or Firm* — John D. Flynn; Gregory K. Goshorn; Greg Goshorn, P.C.

(57) ABSTRACT

Provided is a desktop navigation tool (DNT) for navigation across multiple web pages, including the original and the second web page described in the paragraph above. An "UP" button enables a user to navigate from the new web page back to a different window, opened from a particular window. A "DOWN" (DN) button enables the user to navigate back to a window from which a particular window was spawned. This functionality differs from that found in standard "FORWARD" and "BACK" navigation buttons, typically found in a browser window, which only enable a user to navigate through web pages within a particular window. The claimed subject matter enables a user to navigate more freely and efficiently among multiple windows.

17 Claims, 6 Drawing Sheets

WEB PAGE BACKUP ACROSS MULTIPLE WINDOWS

TECHNICAL FIELD

The present invention relates generally to web browsers and, more specifically, to a method for navigating among multiple web pages displayed within a web browser.

BACKGROUND OF THE INVENTION

From the beginnings of personal computing devices (PCs), techniques have been developed to make PCs easier to use. Originally, to activate a program or open a file, a user was required to enter commands with a keyboard into a command window. One significant improvement over the command window was the graphical user interface, or GUI. A GUI enables a user to navigate among programs by utilizing a computer pointing device, or mouse. Using a mouse, a cursor, which is an on-screen indicator of a specific spot on the display of a PC, may be moved within the display and positioned over one of multiple icons, each of which represent an item such as a file or an executable program. Once positioned over an icon, a button on the mouse is clicked to activate the file or execute the program represented by the icon.

Since computers were invented, users have been inventing ways to connect them together to improve productivity. One advance in the area of computer connectivity is the Internet, a collection of computers that span the world and share a common communication protocol. Tools have been developed in conjunction with the Internet to enable users to more freely take advantage of the numerous available resources.

One such tool is the web browser, which is a GUI that enables a user to navigate the Internet with ease. A web browser is a window displayed in a top-level GUI that enables resources associated with the Internet to be accessed by clicking on items, or "links," in the web page. What is needed is a method and system to enable a user to navigate freely and efficiently among multiple windows associated with a particular web browser.

SUMMARY OF THE INVENTION

When a user of a web browser such as Internet Explorer, published by the Microsoft Corporation of Redmond, Wash., activates a link in a web page by moving the cursor over the link and pressing a button on a mouse, one of two things happens. First, a new web page corresponding to the link is opened in the current web page. The second thing that may happen is a new browser window is opened and the webpage corresponding to the link is opened in the new window. In the second scenario, the original web page is typically remains open and is placed behind and thus obscured by the new web page.

The claimed subject matter provides a desktop navigation tool (DNT) for navigation across multiple web pages, including the original and the second web page described in the paragraph above. An "UP" button enables the user to navigate from the new web page back to a different window, opened from a particular window. A "DOWN" (DN) button enables the user to navigate back to a window from which a particular window was spawned. This functionality is in contrast to the standard "FORWARD" and "BACK" navigation buttons, typically found in a browser window, which only enable a user to navigate through web pages within a particular window. The claimed subject matter enables a user to navigate more freely and efficiently among multiple windows.

This summary is not intended as a comprehensive description of the claimed subject matter but, rather, is intended to provide a brief overview of some of the functionality associated therewith. Other systems, methods, functionality, features and advantages of the invention will be or will become apparent to one with skill in the art upon examination of the following figures and detailed description.

BRIEF DESCRIPTION OF THE FIGURES

A better understanding of the present invention can be obtained when the following detailed description of the disclosed embodiments is considered in conjunction with the following figures, in which.

DETAILED DESCRIPTION OF THE FIGURES

Although described with particular reference to a window-based graphical user interface (GUI), the claimed subject matter can be implemented in any information technology (IT) system in which ease of screen navigation is desirable. Those with skill in the computing arts will recognize that the disclosed embodiments have relevance to a wide variety of computing environments in addition to those described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for screen navigation. The term "programmed method", as used herein, is defined to mean one or more process steps that are presently performed; or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
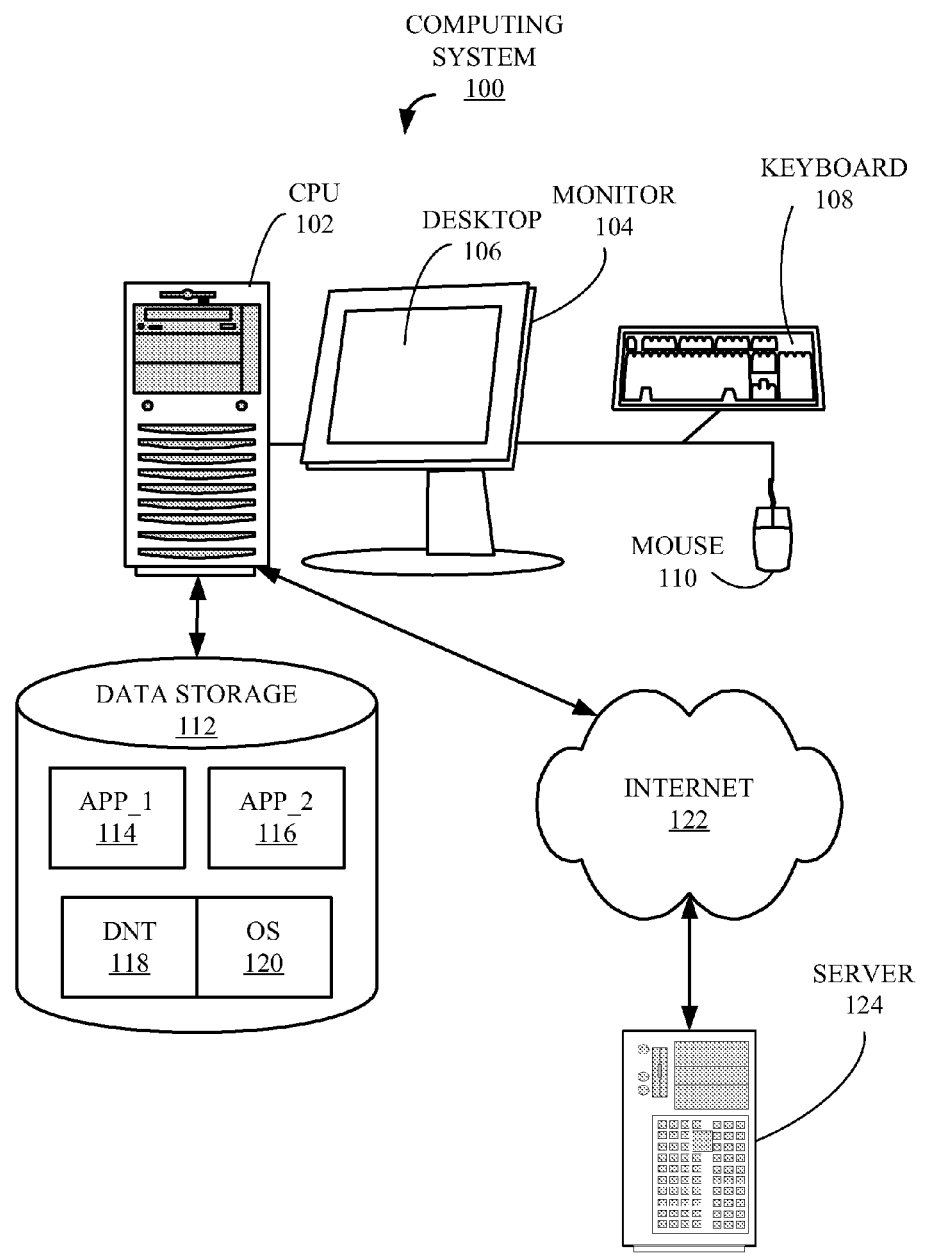
FIG. 1 is a block diagram of a computing system that employs the claimed subject matter.

Turning now to the figures, FIG. 1 is a block diagram of one example of a computing system architecture 100 that incorporates the claimed subject matter. A central processing unit (CPU) 102 is coupled to a monitor 104, a keyboard 108 and a mouse 110, which together facilitate human interaction with CPU 102 and computing system 100. Monitor, or display, 104 presents a desktop 106 to a user. Desktop 106 is shown in more detail below in conjunction with FIG. 2.

Attached to CPU 102 is a data storage component 112, which may either be incorporated into CPU 102 i.e. an internal device, or attached externally to CPU 102 by means of various, commonly available connection devices such as but not limited to, a universal serial bus (USB) port (not shown). Data storage 112 is illustrated storing several exemplary applications, including a first application, or "App_1," 114 and a second application, or "App_2," 116. Both App_1 114 and App_2 116 are used for the purpose of illustration only. It should be noted that a typical computing system may include many applications, but for the sake of simplicity only two are shown.

Also stored on data storage 112 is an operating system (OS) 120 and a Desktop Navigation Tool (DNT) 118, which in this example is a component of OS 120 and implements the claimed subject matter. Although shown as a component of OS 120, in an alternative embodiment, DNT 118 may be a stand-alone component, installed independently of OS 120. In such as embodiment, DNT 118 is initiated either by a user of computing system 100 or computing system 100 is configured to execute DNT 118 automatically. In either embodiment, DNT 118 and OS 120 execute on CPU 102.

CPU 102 is controlled by OS 120, which in this example includes a graphical user interface (GUI) (see FIG. 2) that employs DNT 118 for screen management. CPU 102 is connected to the Internet 122, which is also connected to a server computer 124. Although in this example, CPU 102 and server 124 are communicatively coupled via the Internet, they could also be coupled through any number of communication mediums such as, but not limited to, a local area network (LAN) (not shown). It should be understood that files such as App_1 114, App_2 116 and DNT 118, as well as many other files accessed by CPU 102 may be stored on memory (not shown) coupled to server 124 and delivered over a LAN or the Internet 122 to CPU 102 and/or data storage 112.

Figure 2:
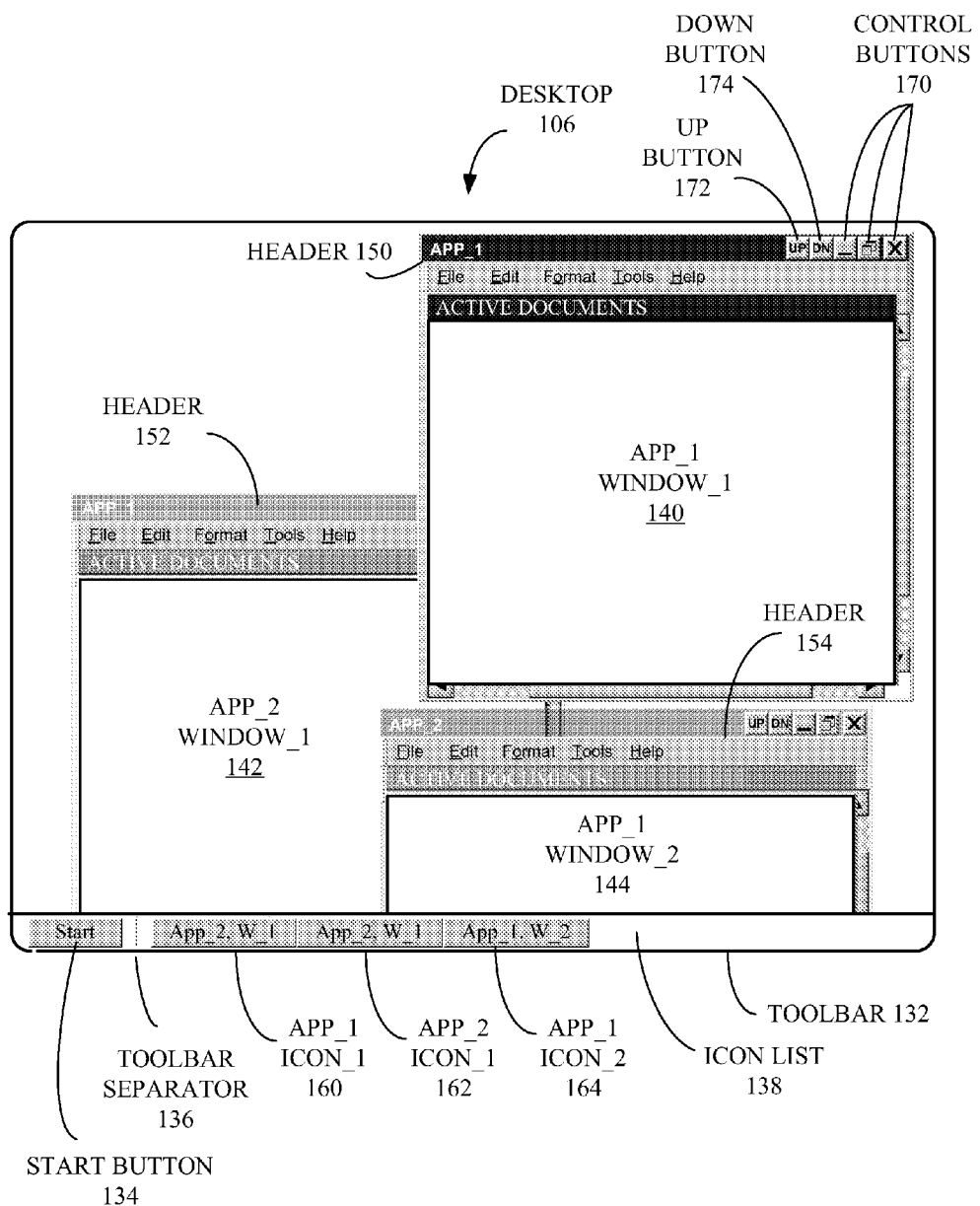
FIG. 2 is an illustration of one example of a desktop as viewed on the monitor and computing system of FIG. 1.

FIG. 2 is an illustration of desktop 106 of FIG. 1 as viewed on monitor, or display, 104 (FIG. 1) of computing system 100 (FIG. 1). Desktop 106 is employed throughout the remainder of this Description as an example of a display managed by DNT 118 (FIG. 1). In this example, desktop 106 is part of a GUI displayed in conjunction with OS 120 (FIG. 1) and DNT 118 is a component of OS 120.

A toolbar 132 extends along the bottom of desktop 106 from the left edge to the right edge of the screen associated with display 104. Within toolbar 132 are a "Start" button 134 and a toolbar separator 136. To the right of toolbar separators 136 is an icon list area 138. Icon list 138 displays icons that indicate the corresponding applications or utilities that are currently loaded and executing on CPU 102. Included in this example are an app_1 icon_1 160, corresponding to app_1 window_1 140, an app_2 icon_1 162, corresponding to app_2 window_1 142 and an app_1 icon_2 164, corresponding to app_1 window_2 144, A certain amount of control, such as terminating execution and maximizing or minimizing a window associated with an application, may be exercised when the user positions a cursor (not shown) over a particular icon 140, 142 or 144 and presses, or "clicks," a button (not shown) on mouse 110 (FIG. 1). Those with skill in the computing arts should be familiar with toolbars and icon areas as well as the use of a mouse and cursor to initiate actions on computing system 100. Further, it should be understood that icons are sometimes referred to as "buttons" in that actions occur when icons are clicked in much the same way that actions occur when physical buttons, such as those on mouse 110, are pressed.

In FIG. 2, desktop 106 is displaying three windows, two of which are associated with app_1 114 (FIG. 1), i.e. app_1 window_1 140 and app_1 window_2 144. A third window in desktop 106 is associated with app_2 116 (FIG. 1), i.e. app_2 window_1 142. In this example, app_1 window_1 140 is the active window in desktop 106, as evidenced by the fact that a corresponding header bar 150 is darker than a header bar 152 and a header bar 154 associated with app_2 window_1 142 and app_1 window_2 144, respectively. It should be noted, that windows 140, 142 and 144 are used only as examples to describe the functionality of the claimed subject matter.

Included in header bar 150 of app_1 window_1 140 are control buttons 170, and UP button 172 and a DOWN (DN) button 174. Control buttons 170, which are grouped together for the sake of simplicity, are standard window control buttons that should be familiar to those with skill in the computing arts. Specifically, control buttons 170 include individual buttons for minimizing, maximizing and terminating corresponding window 140. It should be noted that both app_2 window_1 142 and app_1 window_2 144 include buttons like buttons 170, 172 and 174. In the case of app_2 window_1 142, the buttons are obscured by app_1 window_1 140. In the case of app_1 window_2 146, the buttons are illustrated but not numbered. Functionality associated with UPO button 172 and DN button 174 is described in more detail below in conjunction with FIGS. 3-6.

Figure 3:
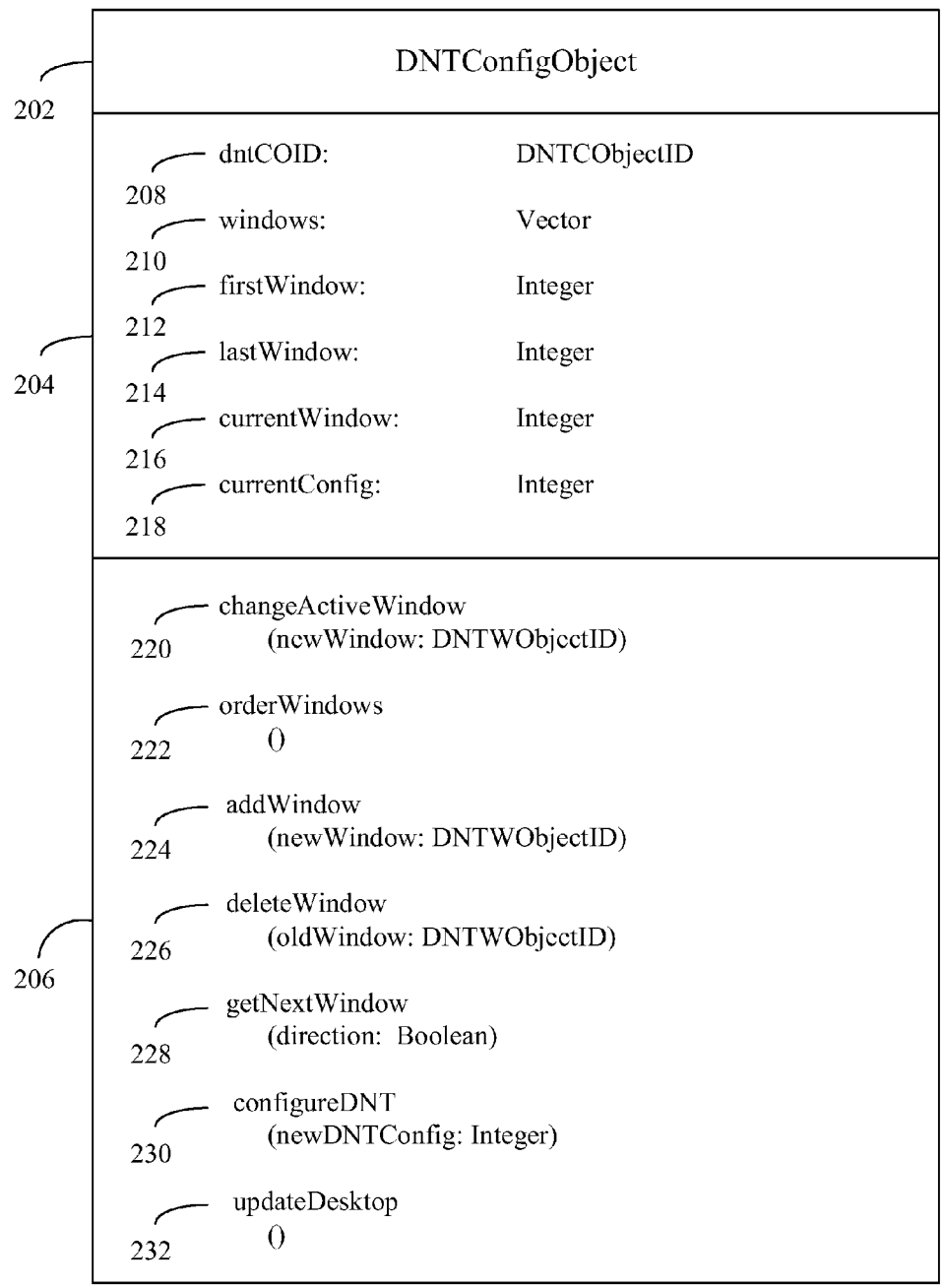
FIG. 3 is one example of a DNT Configuration (DNTC) memory object employed in one implementation of the claimed subject matter.

FIG. 3 is one example of a DNT Configuration memory object 200 (DNTC) employed by DNT 118 of FIG. 1 in one implementation of the claimed subject matter. DNTC memory object 200 includes a title section 202, which merely states the name of object 200, i.e. "DNTConfigObject," an attribute section 204, which contains memory elements, or attributes, associated with DNTC memory object 200, and a method section 206, which includes functions, or methods, that may be executed in conjunction with DNTC memory object 200. It should be noted that the attributes and methods described are used for the purpose of illustration only. Additional and/or different attributes and methods may be employed to implement the claimed subject matter.

Attribute section 202 includes a dntCOID attribute 208, a Windows attribute 210, a firstWindow attribute 212, a lastWindow attribute 214, a currentWindow attribute 216 and a currentConfig attribute 218. DntCOID attribute 208 is a variable of type DNTCObjectID that contains a reference to the particular instance of DNTC 200. Each instance of DNTC 200 has a unique value for attribute 208 that allows each instance to be uniquely identified. Those with skill in the computing arts should recognize that there are many other possible configurations of DNT 118 and DNTC 200 and that each of other possible configurations would likely necessitate additional or different attributes and methods for implementation.

Windows attribute 210 is a variable of type Vector that stores a list of DNTWindow memory objects (DNTW) 250 (see FIG. 4), each of which stores information relating to windows either displayed or minimized on a corresponding desktop 106 (FIGS. 1 and 2). In this example, windows 210 would include variables that store identifying and configuration information on the windows of desktop 106 (FIGS. 1-4), i.e. app_1 window_1 140 (FIG. 2), app_2 window_1 142 (FIG. 2) and app_1 window_2 144 (FIG. 2). Types of information stored in a DNTW 250 is described in more detail below in conjunction with FIG. 4.

FirstWindow attribute 212 is a variable of type Integer that stores a position within windows vector 210 corresponding to a specific window that is first in the vector of windows 210, although this would typically be but not necessarily the first element. LastWindow attribute 214 is a variable of type Integer that stores a position within windows vector 210 corresponding to a last window in the vector of windows 210. CurrentWindow attribute 216 is a variable of type Integer that stores a position within windows vector 210 corresponding to the currently active window with respect to display 106.

CurrentConfig attribute 218 is a variable of type integer that represents a bitmap of various configuration options associated with DNTC 200 of the corresponding DNT 118. One example of a particular configuration option includes two bits that represent whether the corresponding DNT 118 is configured to process navigation request based upon time of window instantiation, a priority code assigned to individual window or some combination of the two. Another configuration option addresses how DNT 118 handles an active window when a user clicks DN button 174 to return to a previous window. In one configuration the active window is automatically closed; in another configuration, the previously active window is not closed. Another configuration option may involve the position of the cursor following execution of either UP button 172 or DN button 174. For example, the cursor may be positioned either within the new window or on UP button 172 or DN button 174 in the new active window so that the user may easily navigate through a succession of windows. The use of attributes 210, 212, 214, 216 and 218 are explained in more detail below in conjunction with FIGS. 4-6.

Method section 204 includes a changeActiveWindow method 220, an orderWindows method 222, an addWindow method 224, a deleteWindow method 226, a getNextWindow method 228, a configureDNT method 230 and a updateDesktop method 232. ChangeActiveWindow method 220 is called when a user desires to change the specific active window in display 106, either by clicking upon a different window or by employ UP button 172 or DN button 174. Method 220 is called with one (1) parameter: a "newWindow" parameter of type DNTWObjectID that uniquely identifies the window being designated the new active window. In the following examples, app_1 window_1 140 is the active window, app_2 window_1 142 is the previous window in window attribute 210, and app_1 window_2 144 is the next window in the defined order. A process associated with changing the active window is described in more detail below in conjunction with FIG. 6.

OrderWindows method 222 is called when DNT 118 is first initiated or after DNT 118 has been reconfigured during execution of configureDNT method 228. AddWindow method 224 is called when a new window is instantiated. Depending upon the particular implementation of DNT 118, method 224 is executed when a new window is detected, typically in conjunction with an interrupt to OS 120 (FIG. 1). Method 224 is called with one (1) parameter: a "newWindow" parameter of type DNTWObjectID that uniquely identifies the window being added.

DeleteWindow method 226 is called when a window is terminated, either because the user has explicitly closed the window or because the user has backed out of the window and DNT 118 is configured to close a window in that circumstance. Depending upon the particular implementation of DNT 118, method 226 may be executed when the termination of a window is detected, typically in conjunction with an interrupt to OS 120 (FIG. 1). Method 226 is called with one (1) parameter: an "oldWindow" parameter of type DNTWObjectID that uniquely identifies the window being terminated.

GetNextWindow method 228 is called when the user navigates from one window to another by employing UP button 172 or DN button 174 in the current window. Typically, method 228 is executed in conjunction with method 220 to determine the appropriate window to make active. Method 228 is called with one (1) parameter: a "direction" parameter of type Boolean that specifies whether the requested window is the next or previous window listed in windows attribute 210.

ConfigureDNT method 230 is executed either when DNT 118 is initiated or when the user desires a new configuration for DNT 118. As described above, examples of configuration include, but are not limited to, a first in time vs. a priority order for the ordering of windows listed in windows attribute 210 and the handling of a window from which the user has navigated. Method 230 is called with one (1) parameter: a "newDNTConfig" parameter of type Integer that specifies the new desired settings for DNT 118. Finally, updateDesktop method 232 is executed when the situation with respect of the windows has been modified. For example, any time a configuration of DNT 118 or a window has changed or a window has been initiated, terminated or reconfigured.

Figure 4:
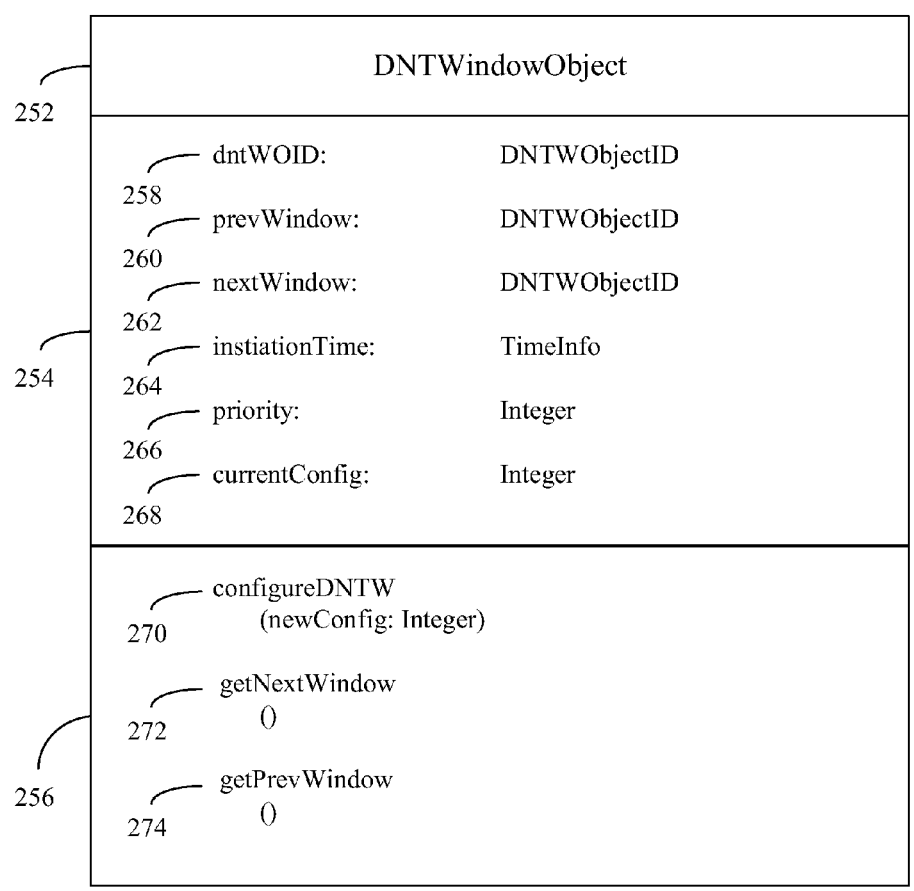
FIG. 4 is one example of a DNT Window (DNTW) memory object employed in one implementation of the claimed subject matter.

FIG. 4 is one example of a DNT Window memory object (DNTW) 250 employed in one implementation of the claimed subject matter. DNTW 250 is associated with a specific window, such as app_1 window_1 140 (FIG. 2), app_2 window_1 142 (FIG. 2) and app_1 window_2 144 (FIG. 2). DNT 118 (FIG. 1) employs instantiations of DNTW 250 in conjunction with DNTC 200 to manage windows in display 106 (FIG. 1). DNTW memory object 250 includes a title section 252, which merely states the name of object 200, i.e. "DNTWindowObject," an attribute section 254, which contains memory elements, or attributes, associated with DNTW memory object 250, and a method section 256, which includes functions, or methods, that may be executed in conjunction with DNTW memory object 250. It should be noted that the attributes and methods described are used for the purpose of illustration only. Additional and/or different attributes and methods may be employed to implement the claimed subject matter.

Attribute section 252 includes a dntWOID attribute 258, a prevwindow attribute 260, a nextWindow attribute 262, an instantiationTime attribute 264, a priorty attribute 266 and a currentConfig attribute 268. DntWOID attribute 258 is a variable of type DNTWObjectID that contains a reference to the particular instance of DNTW 250. Each instance of DNTW 250 has a unique value for attribute 258 that allows each instance to be uniquely identified. Those with skill in the computing arts should recognize that there are many other possible configurations of DNT 118 and DNTW 250 and that each of other possible configurations would likely necessitate additional or different attributes and methods for implementation.

PrevWindow attribute 260 is a variable of type DNTWObjectID that stores a unique identifier to a DNTW memory object 250 that corresponds to a window that is before the current window in windows attribute 210 (FIG. 3). In other words, attribute 260 stores an identifier to a window that becomes the active window if the user clicks on DN button 174 in the current window. As explained above in conjunction with FIG. 3, in the following examples, the current window is app_1 window_1 140 and the previous window is app_2 window_1 142 and the next window is app_1 window_2 144.

NextWindow attribute 262 is a variable of type DNTWObjectID that stores a unique identifier to a DNTW memory object 250 that corresponds to a window that is the next window in windows attribute 210. In other words, attribute 262 stores an identifier to a window that becomes the active window if the user clicks on UP button 172 in the current window. InstantiationTime attribute 264 is a variable of type TimeInfo that stores a timestamp corresponding to the time that the associated window was created. In one embodiment, DNT 118 orders windows in the order that the windows were created to create a navigation sequence responsive to UP button 172 and DN button 174. In another embodiment, DNT 118 determines a navigation sequence based upon the last time each window was accesses. In that case, attribute stores a time corresponding to a last access time rather than an instantiation time.

Priority attribute 266 is a variable of type Integer that stores a priority code employed by DNT 118 to order the windows in a navigation sequence based upon an assigned priority level. As explained above, various configurations of DNT 118 enable a user to specify a hierarchy for the arrangement of the windows in display 106 into a navigation sequence. Examples of navigation sequences include, but are not limited to, a sequence based upon instantiation time, last access time and an assigned priority level.

CurrentConfig attribute 268 is a variable of type integer that represents a bitmap of various configuration options associated with DNTW 250. One example of a particular configuration option includes bits that represent whether the window terminates, minimizes or merely is set inactive when the user navigates away from the window. In other words, this particular option may be set at the window granularity level with currentConfig attribute 218 (FIG. 3) of DNTC 200 storing a default value and attribute 268 storing a value corresponding to the associated window that overrides the default value if set. The use of attributes 260, 262, 264, 266 and 268 are explained in more detail below in conjunction with FIGS. 5-6.

Method section 254 includes a configureDNTW method 270, a getNextWindow method 272 and a getPrevWindow method 274. ConfigureDNTW method 270 is called when a user either sets up or reconfigures the window associated with DNTW 250. Method 270 is called with one (1) parameter: a "newConfig" parameter of type Integer that stores the bitmap stored in currentConfig attribute 268 and employed by DNT 118 to control the properties of the window associated with DNTW 250.

GetNextWindow method 272 is called when UP button 272 (FIG. 2) is clicked and serves to identify the next window that should become active. As explained above in conjunction with FIG. 3, the identification of the next active window is based upon information stored in currentConfig attribute 218. The process associated with a transition to the next window is described in detail below in conjunction with FIG. 6. GetPrevWindow method 274 is called when DN button 274 (FIG. 2) is clicked and serves to identify the previous window that should become active. The process associated with a transition to the previous window is described in detail below in conjunction with FIG. 6.

Figure 5:
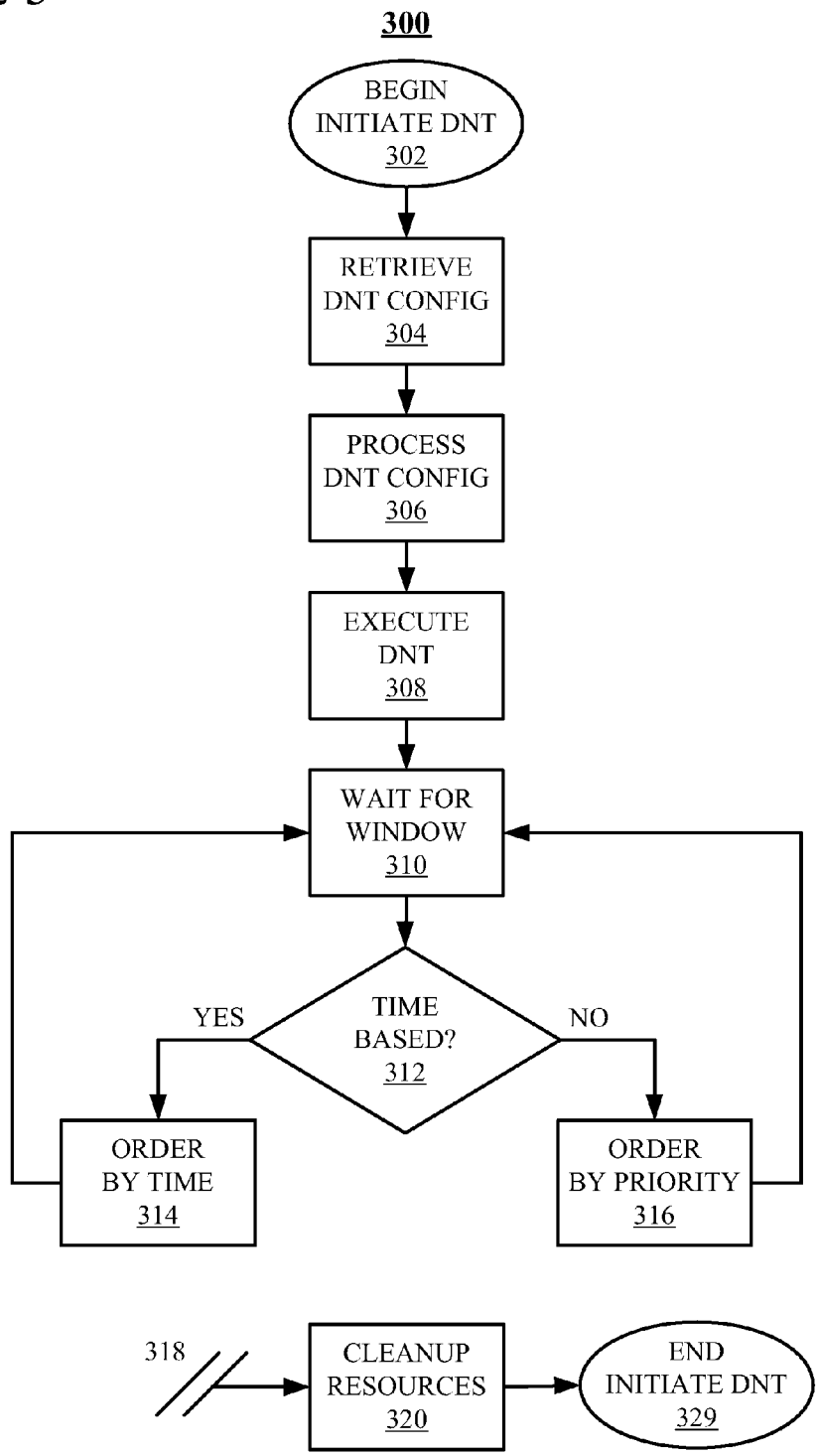
FIG. 5 is a flowchart of one example of a Setup DNT process that configures the DNT of FIG. 1.

FIG. 5 is a flowchart of one example of a Setup DNT process 300 that configures and instantiates DNT 118 of FIG. 1. In the following example, process 300 is stored on data storage 112 (FIG. 1) and is executed on CPU 102 (FIG. 1). Although illustrated in FIG. 1 as incorporated into OS 120 (FIG. 1), in an alternative embodiment, DNT 118 may be a stand-alone window management application or a plug-in module.

Process 300 starts in a "Begin Initiate DNT" block 302 and proceeds immediately to a "Retrieve DNT Configuration" block 304. During block 304, process 300 retrieves a configuration file (not shown) stored on data storage 112 (FIG. 1) in conjunction with DNT 118. The configuration file includes an instantiation of DNCO 200 (FIG. 3), which stores much of the information necessary to configure and execute DNC 118. The configuration file also includes information concerning the desired configuration of DNT 118, including but not limited to, the particular display options that the user intends to implement.

During a "Process DNT Configuration" block 306, process 300 parses the instantiation of DNCO 200 retrieved during block 304. During an "Execute DNT" block 308, process 300 spawns an Execute DNT process 350, which is described in more detail below in conjunction with FIG. 6. During a "Wait for Window" block 310, process 300 waits for an indication from the GUI associated with OS 120 (FIG. 1) that a new window has been created.

During a "Time Based?" block 312, process 300 determines, based upon DNTC 200 retrieved during block 304 whether or not DNT 118 is configured to establish an order for window navigation based upon time or priority. If process 300 determines that the screen navigation order is based upon time, control proceeds to an "Order by Time" block 314. During block 314, process 300 creates and initializes a DNTW 250 memory object corresponding to the new window detected during block 310, inserts the created DNTW object 250 in windows attribute 210 (FIG. 3) in the appropriate position based up instantiation time attribute 264 (FIG. 4) and also updates prevwindow attribute 260 (FIG. 4) and nextWindow attribute 262 (FIG. 4) of DNTW 250 objects stored in DNTC 200. Process 300 also updates currentWindow attribute 216 of DNTC 200 and, if necessary, firstWindow attribute 212 (FIG. 3) and lastWindow attribute 214 (FIG. 3).

If, during block 312, process 300 determines that the configured navigation scheme is based upon priority rather than time, then control proceeds to an "Order by Priority" block 316. During block 316, process 300 creates and initializes a DNTW 250 memory object corresponding to the new window detected during block 310, inserts the created DNTW object 250 in windows attribute 210 (FIG. 3) in the appropriate position based up priority attribute 266 (FIG. 4) and also updates prevWindow attribute 260 and nextWindow attribute 262 of DNTW 250 memory objects stored in DNTC 200. Process 300 also updates currentWindow attribute 216 of DNTC 200. Following completion of processing during blocks 314 and 316 control returns to Wait for Window block 310 and process continues as described above.

Process 300 is designed to execute as long as the GUI associated with OD 120 is operating, i.e. which computing system 100 (FIG. 1) is operating. In the event that computing system 100 is powered off or the user wishes to disable DNT 118 an asynchronous interrupt 318 is transmitted to process 300. Asynchronous interrupt 318 takes control of process 300 from whatever point block is currently executing and passes control to a "Cleanup Resources" block 320. During block 320, process 300 frees memory allocated during execution, saves parameters and, possibly saves information relating to the current execution of process 300. Finally, during an "End Initiate DNT" block 329, process 300 is complete.

Figure 6:
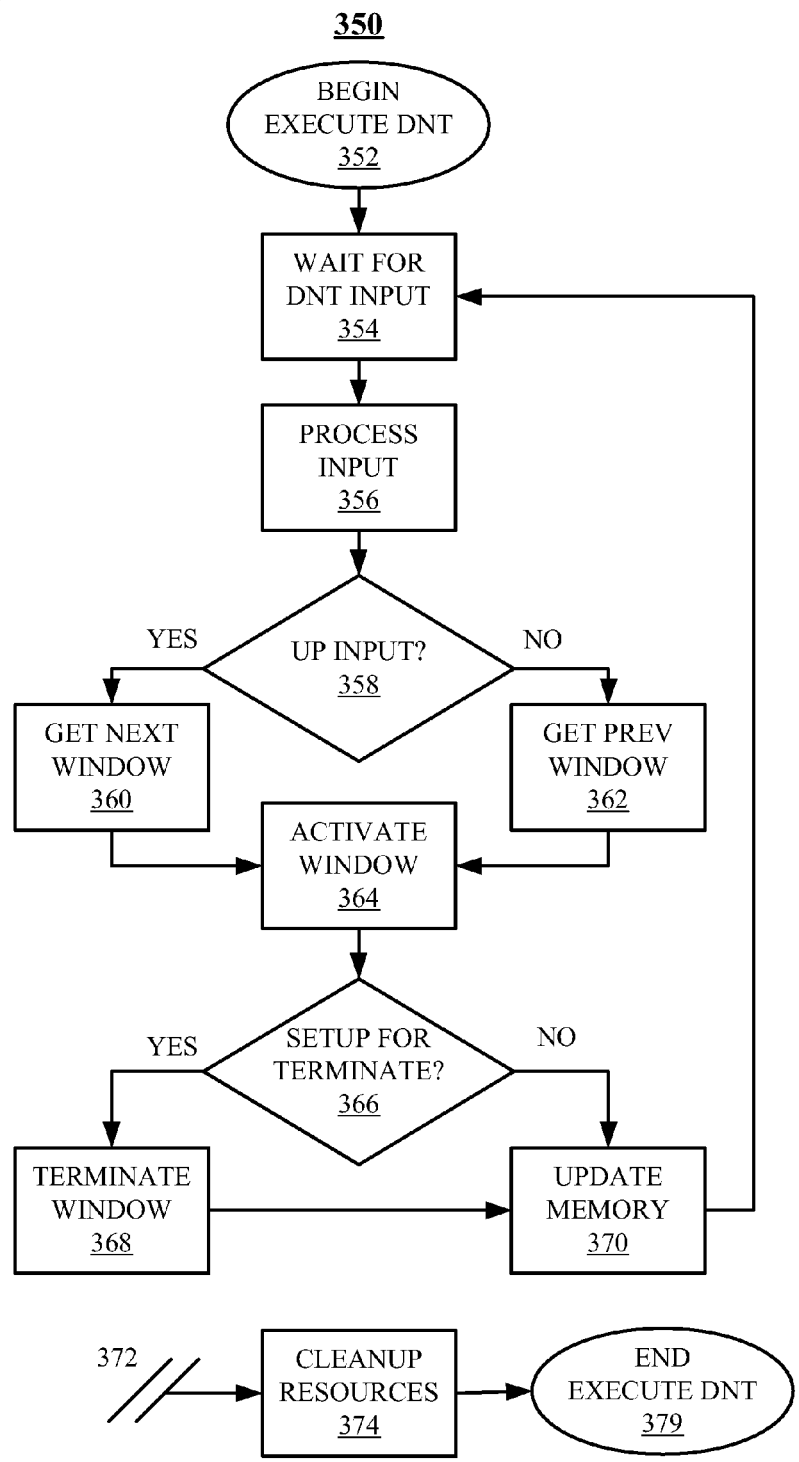
FIG. 6 is a flowchart of one example of a desktop navigation process executed by the DNT of FIG. 1.

FIG. 6 is a flowchart one example of a desktop navigation process 350 executed by the DNT 118 of FIG. 1. Like process 300 (FIG. 5), process 350 is stored on data storage 112 (FIG. 1) and is executed on CPU 102 (FIG. 1). As explained above in conjunction with FIG. 4, process 350 is initiated during Execute DNT block 308 (FIG. 4).

Process 350 starts in a "Begin Execute DNT" block 352 and control proceeds immediately to a "Wait for DNT Input" block 354. During block 354, process 350 waits for an indication from OS 120 (FIG. 1) that a window navigation request has been received. Such a request is initiated by a user clicking on an UP button 172 or a DN button 174 in a window such as app_1 window1 140 (FIG. 2), app_2 window_1 142 (FIG. 2) and app_1 window_2 144 (FIG. 2). During a "Process Input" block 356, process 350 ascertains the type of input received during block 354 and the window from which the input originated. Typically, the originating window is the window corresponding to currentWindow attribute 216 (FIG. 3) of DNTC 200 (FIG. 3). In the following examples, initially app_1 window_1 140 is the active, or current window, app_2 window_1 142 is the previous window and app_1 window_2 144 is the next window in the order defined in windows attribute 210 (FIG. 3).

During an "UP Input?" block 358, process 350 determines whether the input received during block 354 and parsed during block 356 is from an UP button 172 or a down button 174. If the input is from an UP button 172, process 350 proceeds to a "Get Next Window" block 360. During block 360, process 350 retrieves nextWindow attribute 262 (FIG. 4) from the DNTW object 250 (FIG. 4) corresponding to the current window. If during block 358, process 350 determines that the input received during block 354 and parsed during block 356 is from a DN button 174, process 350 proceeds to a "Get Previous Window" block 362. During block 362, process 350 retrieves prevwindow attribute 264 (FIG. 4) from the DNTW object 250 (FIG. 4) corresponding to the current window.

During an "Activate Window" block 364, process 350, depending upon the determination made in block 358, makes either the next window, as determined in block 360 or the previous window, as determined during block 362, the active window of display 106 (FIGS. 1 and 2). During a "Setup for Terminate?" block 366, process 350 determines whether or not DNT 118 is configured to terminate a window from which the user has navigated. If so, process 350 proceeds to a "Terminate Window" block 368 during which the window that was navigated from is terminated. As explained above in conjunction with FIG. 4, the terminate option may be set as a default for every window managed by DNT 118, may be configured on a window-by-window basis, or some combination of the two approaches.

During an "Update Memory" block 370, process 350 updates memory object 200 and any memory objects 250 associated with affected windows. Affected windows may include, but is not limited to, the new and old current, next and previous windows. Once memory is updated during block 370, process 350 returns to Wait for DNT Input block 354 and processing continues as described above.

Like process 300 (FIG. 5), process 350 is designed to execute as long as the GUI associated with OD 120 is operating, i.e. which computing system 100 (FIG. 1) is operating. In the event that computing system 100 is powered off or the user wishes to disable DNT 118 an asynchronous interrupt 372 is transmitted to process 350. Asynchronous interrupt 372 takes control of process 350 from whatever point block is currently executing and passes control to a "Cleanup Resources" block 374. During block 374, process 350 frees memory allocated during execution, saves parameters and, possibly saves information relating to the current execution of process 350. Finally, during an "End Execute DNT" block 379, process 350 is complete.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

We claim:

1. A system, stored in a memory for execution on a processor, for managing web pages displayed in a web browser, the system comprising:
a display monitor;
logic for displaying on the display a first web page in a first window;
a first user-assigned priority code associated with the first web page;
logic for displaying and activating a second web page in a second window in response to a user selection on the first web page;
a second, user-assigned priority code associated with the second web page, wherein the first and second priority codes are independent of an access order associated with the first and second web pages and wherein the first and second priority codes specify a priority ordering corresponding to an order of display of the first and second web pages;
a first navigation button displayed in conjunction with the second window;
logic for deactivating the second web page and the second window and reactivating the first web page in response to a user selection corresponding to the first navigation button; wherein the user selection is implemented with a single click on the first navigation button; and,
logic for navigating between the first and second web pages based upon the first and second priority codes.

2. The system of claim 1, further comprising:
a second navigation button display in conjunction with the first window; and
logic for deactivating the first web page and reactivating the second web page and the second window in response to a user selection corresponding to the second navigation button.

3. The system of claim 1, further comprising logic for terminating the second window in response to the user selection corresponding to the first navigation button.

4. The system of claim 3, further comprising:
a system configuration option corresponding to a user window termination preference;
wherein the logic for terminating the second window in response to the user selection corresponding to the first navigation button is executed only when the system configuration option is set.

5. The system of claim 4, further comprising:
a web page configuration option corresponding to the second window;

wherein the logic for terminating the second window in response to the user selection corresponding to the first navigation button is executed only when the web page configuration option is set, regardless of the setting of the system configuration option.

6. The system of claim 1, wherein the system is incorporated into an operating system.

7. A method for managing web pages displayed in a web browser, the method comprising:
- displaying on a computer display a first web page in a first window;
- assigning, by a user, a first priority code to the first web page;
- activating a second web page in a second window in response to a user selection on the first web page;
- assigning, by the user, a second priority code to the second web page, wherein the first and second priority codes are independent of an access order associated with the first and second web pages and wherein the first and second priority codes specify a priority ordering corresponding to an order of display of the first and second web pages;
- displaying a first navigation button in conjunction with the second window;
- deactivating the second web page and the second window and reactivating the first web page in response to a user selection corresponding to the first navigation button; wherein the user selection is implemented with a single click on the first navigation button; and
- navigating between the first and second web pages based upon the first and second priority codes.

8. The method of claim 7, further comprising:
- displaying a second navigation button in conjunction with the first window; and
- deactivating the first web page and reactivating the second web page and the second window in response to a user selection corresponding to the second navigation button.

9. The method of claim 7, further comprising terminating the second window in response to the user selection corresponding to the first navigation button.

10. The method of claim 9, further comprising:
- setting a system configuration option corresponding to a user window termination preference;
- wherein terminating the second window in response to the user selection corresponding to the first navigation button is executed only when the system configuration option is set.

11. The method of claim 10 further comprising:
- setting a web page configuration option corresponding to the second window;
- wherein terminating the second window in response to the user selection corresponding to the first navigation button is executed only when the web page configuration option is set, regardless of the setting of the system configuration option.

12. The method of claim 7, wherein the method is incorporated into an operating system.

13. A computer programming product for managing web pages displayed in a web browser, the method comprising:
- a non-transitory computer-readable storage medium; and
- logic, stored on the computer-readable storage medium for execution on a processor, for:
  - displaying on a computer display a first web page in a first window;
  - assigning, by a user, a first priority code to the first web page;
  - activating a second web page in a second window in response to a user selection on the first web page;
  - assigning, by a user, a second priority code to the second web page wherein the first and second priority codes are independent of an access order associated with the first and second web pages and wherein the first and second priority codes specify a priority ordering corresponding to an order of display of the first and second web pages;
  - displaying a first navigation button in conjunction with the second window;
  - deactivating the second web page and the second window and reactivating the first web page in response to a user selection corresponding to the first navigation button; wherein the user selection is implemented with a single click on the first navigation button; and
  - navigating between the first and second web pages based upon the first and second priority codes.

14. The computer programming product of claim 13, further comprising:
- logic, stored on the computer-readable storage medium for execution on the processor, for displaying a second navigation button in conjunction with the first window; and
- logic, stored on the computer-readable storage medium fir execution on the processor, for deactivating the first web page and reactivating the second web page and the second window in response to a user selection corresponding to the second navigation button.

15. The computer programming product of claim 13, further comprising logic, stored on the computer-readable storage medium for execution on the processor, for terminating the second window in response to the user selection corresponding to the first navigation button.

16. The computer programming product of claim 15, further comprising:
- logic, stored on the computer-readable storage medium for execution on the processor, for setting a system configuration option corresponding to a user window termination preference;
- wherein the logic for terminating the second window in response to the user selection corresponding to the first navigation button is executed only when the system configuration option is set.

17. The computer programming product of claim 16, further comprising:
- logic, stored on the computer-readable storage medium for execution on the processor, for setting a web page configuration option corresponding to the second window;
- wherein terminating the second window in response to the user selection corresponding to the first navigation button is executed only when the web page configuration option is set, regardless of the setting of the system configuration option.

* * * * *